(12) United States Patent
Mathal et al.

(10) Patent No.: US 6,501,737 B1
(45) Date of Patent: Dec. 31, 2002

(54) METHOD FOR DETERMINING A QUANTITY OF CHANNEL RESOURCES TO RESERVE FOR DATA SERVICES IN A COMMUNICATION SYSTEM

(75) Inventors: Stinson S. Mathal, Des Plaines, IL (US); Karen Brailean, San Diego, CA (US); Scott Alan Jordan, Irvine, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/451,735

(22) Filed: Nov. 30, 1999

(51) Int. Cl.[7] .......................... G06F 11/00; H04L 12/28
(52) U.S. Cl. .................. 370/252; 370/337; 370/347; 370/389; 370/443; 455/509
(58) Field of Search .................. 370/230, 235, 370/252, 329, 336, 337, 345, 347, 348, 349, 352, 389, 431, 443, 458; 455/509, 511, 516

(56) References Cited

U.S. PATENT DOCUMENTS 4,593,230 A * 6/1986 True ........................... 313/349
4,819,230 A * 4/1989 Calvignac et al. .......... 370/354
4,870,408 A * 9/1989 Zdunek et al. .............. 370/327

* cited by examiner

Primary Examiner—Hassan Kizou
Assistant Examiner—Asfar M. Qureshi
(74) Attorney, Agent, or Firm—Jeffrey K. Jacobs

(57) ABSTRACT

To address the need for a method to determine an optimal quantity of channel resources to reserve for data services in communication systems that support both data and voice services, the present invention provides two methods. The methods determine a minimum quantity of voice channel resources that are required to provide an acceptable voice quality of service. The methods also determine an additional quantity of data channel resources needed to provide data services. The methods then determine whether encroachment by the voice services onto the data channel resources requires that a number of the data channel resources be reserved for data services exclusively. Finally, if data channel resources need to be reserved, the methods determine a minimum number of data channel resources to reserve to provide an acceptable data quality of service.

19 Claims, 3 Drawing Sheets

METHOD FOR DETERMINING A QUANTITY OF CHANNEL RESOURCES TO RESERVE FOR DATA SERVICES IN A COMMUNICATION SYSTEM

FIELD OF THE INVENTION

The present invention relates generally to communication systems and, in particular, to a method for determining a quantity of channel resources to reserve for data services in a communication system that supports both data and voice services.

BACKGROUND OF THE INVENTION

Mobile communication systems, that once only provided voice services, are today being developed to provide voice and data services to mobile communication units. In such systems, the voice and data services can share a pool of channel resources, each service using available channel resources as needed. When voice and data services are contending for the same specific channel resources, however, priority is given to the voice services.

During periods of high voice service traffic the data services are left with few channel resources and thus become unavailable or exhibit relatively long data delays. Such degraded data service typically becomes unacceptable to users below a certain level of service. To prevent an unacceptable level of data service, channel resources are removed from the pool of common channel resources and reserved for use by data services exclusively.

Making channel resources unavailable to the voice services, however, reduces the peak voice service capacity of the communication system. Optimally, the communication system should guarantee a certain minimal level of data service while maintaining a maximum capacity for peak voice service traffic. The need for such a solution is most acute for systems with fixed channel resources, since additional channel resources may not be available for adding data services due to spectrum constraints or the required expense.

Equations for determining channel resource requirements for given voice traffic loads are known. Equations for determining channel resource requirements for data traffic loads are also known from queuing theory. The prior art is limited to addressing channel resource needs for voice services and data services separately, but not combined as these services are in today's communication systems. Therefore, a need exists for a method for determining an optimal quantity of channel resources to reserve for data services in communication systems that support both data and voice services.

DESCRIPTION OF A PREFERRED EMBODIMENT

Figure 1A:
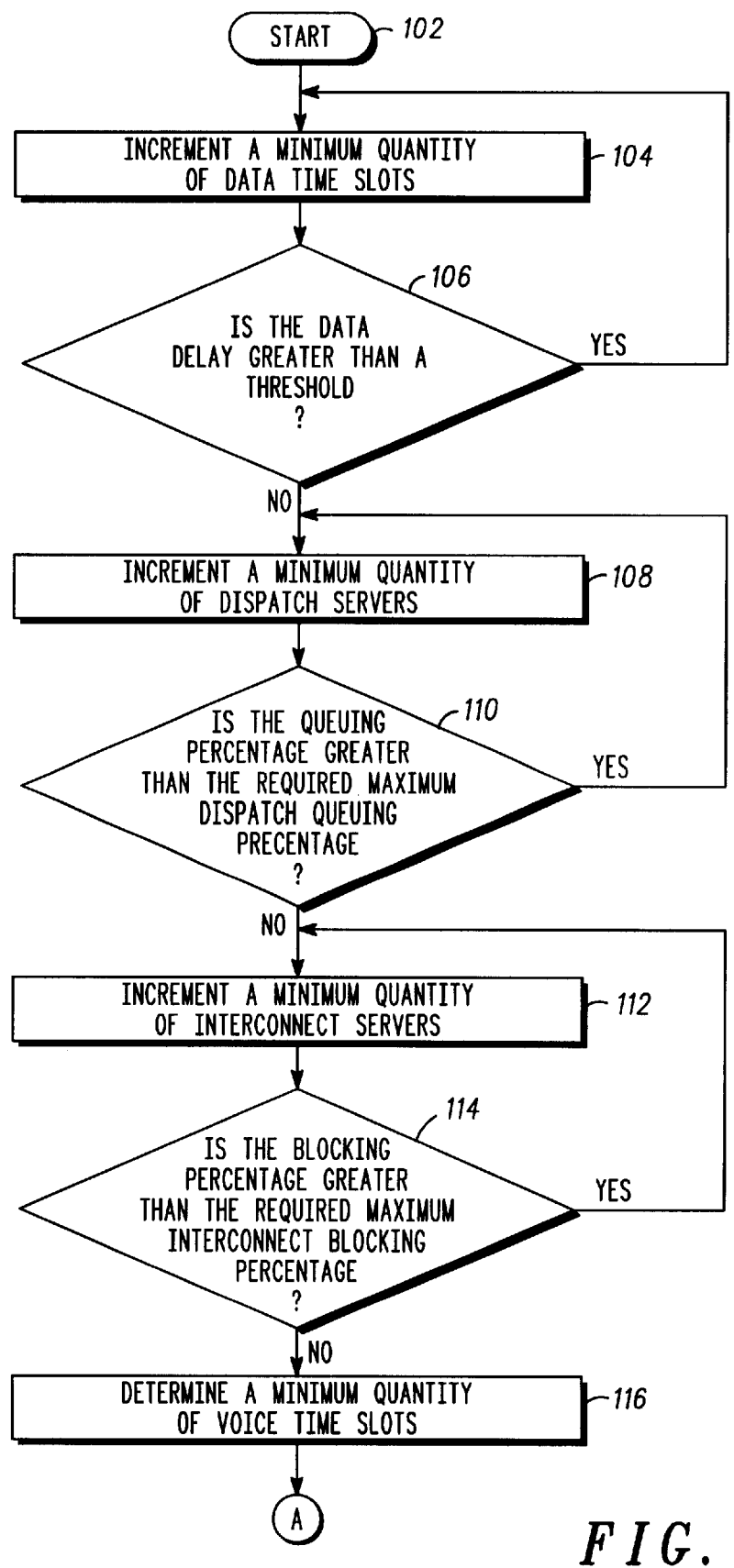
FIG. 1 is a logic flow diagram of steps executed, in accordance with a preferred embodiment of the present invention, to determine a quantity of channel resources to reserve for data services in a communication system, when a total quantity of channel resources in the communication system is not fixed.

To address the need for a method to determine an optimal quantity of channel resources to reserve for data services in communication systems that support both data and voice services, the present invention provides two methods. The methods determine a minimum quantity of voice channel resources that are required to provide an acceptable voice quality of service. The methods also determine an additional quantity of data channel resources needed to provide data services. The methods then determine whether encroachment by the voice services onto the data channel resources requires that a number of the data channel resources be reserved for data services exclusively. Finally, if data channel resources need to be reserved, the methods determine a minimum number of data channel resources to reserve to provide an acceptable data quality of service.

The present invention encompasses a first method to determine a quantity of channel resources to reserve for data services in a communication system that supports both data services and voice services. The first method presumes that a total quantity of channel resources in the communication system is not fixed and has not yet been established. In the first method, a minimum number of channel resources necessary to provide data services is determined based on a data traffic profile. This determination produces a minimum quantity of data channel resources. A minimum number of channel resources necessary to provide voice services that meet a required voice quality of service profile is determined. This determination produces a minimum quantity of voice channel resources. Based on both the minimum quantity of data channel resources and the minimum quantity of voice channel resources, a total number of channel resources available for voice services and data services in the communication system is determined. A data channel availability file that indicates a predicted availability of the minimum quantity of data channel resources is determined based on the voice traffic profile and total number of channel resources. Finally, upon determining whether the data channel availability profile is acceptable based on a required data channel availability profile, a reserved data channel quantity is set. When the data channel availability profile is acceptable based on the required data channel availability profile, the reserved data channel quantity is set to zero. Otherwise, when the data channel availability profile is not acceptable based on the data channel availability profile, the reserved data channel quantity is set to a minimum number of data channel resources.

Additionally, the present invention encompasses a second method to determine a quantity of channel resources to reserve for data services in a communication system in which a total quantity of channel resources is fixed. In the second method, a minimum number of channel resources necessary to provide voice services that meet a required voice quality of service profile are determined based on a voice traffic profile. This determination produces a minimum quantity of voice channel resources. Next, the minimum quantity of voice channel resources is subtracted from the total quantity of channel resources provided by communication devices in the communication system to produce a quantity of data channel resources. A data channel availability profile that indicates a predicted availability of the quantity of data channel resources is determined based on the voice traffic profile and the minimum quantity of voice channel resources. Finally, upon determining whether the data channel availability profile is acceptable based on a required data channel availability profile, a reserved data channel quantity is set. When the data channel availability profile is acceptable based on the required data channel availability profile, the reserved data channel quantity is set to zero. Otherwise, when the data channel availability profile is not acceptable based on the data channel availability profile, the reserved data channel quantity is set to one.

Figure 1B:
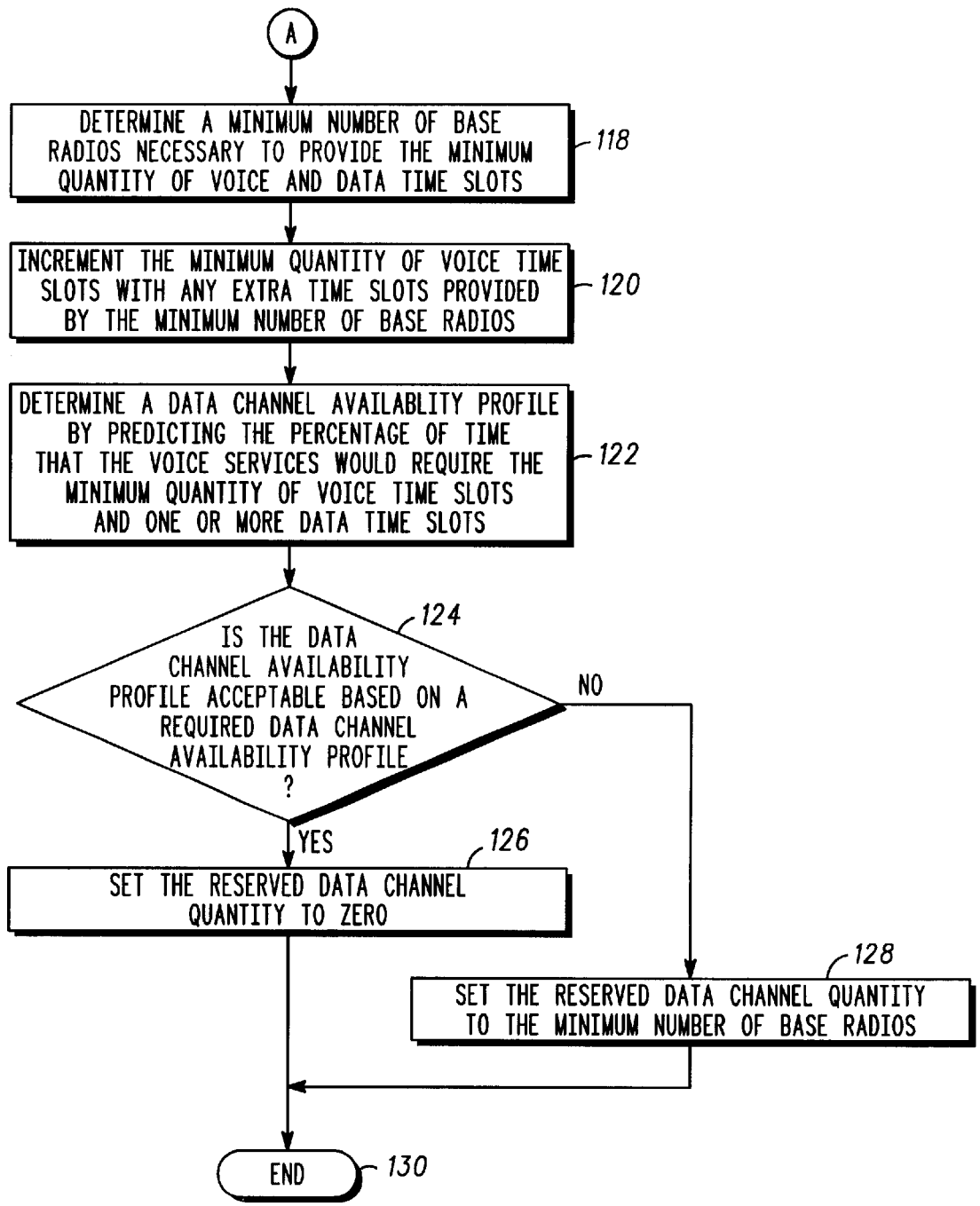
Figure 2:
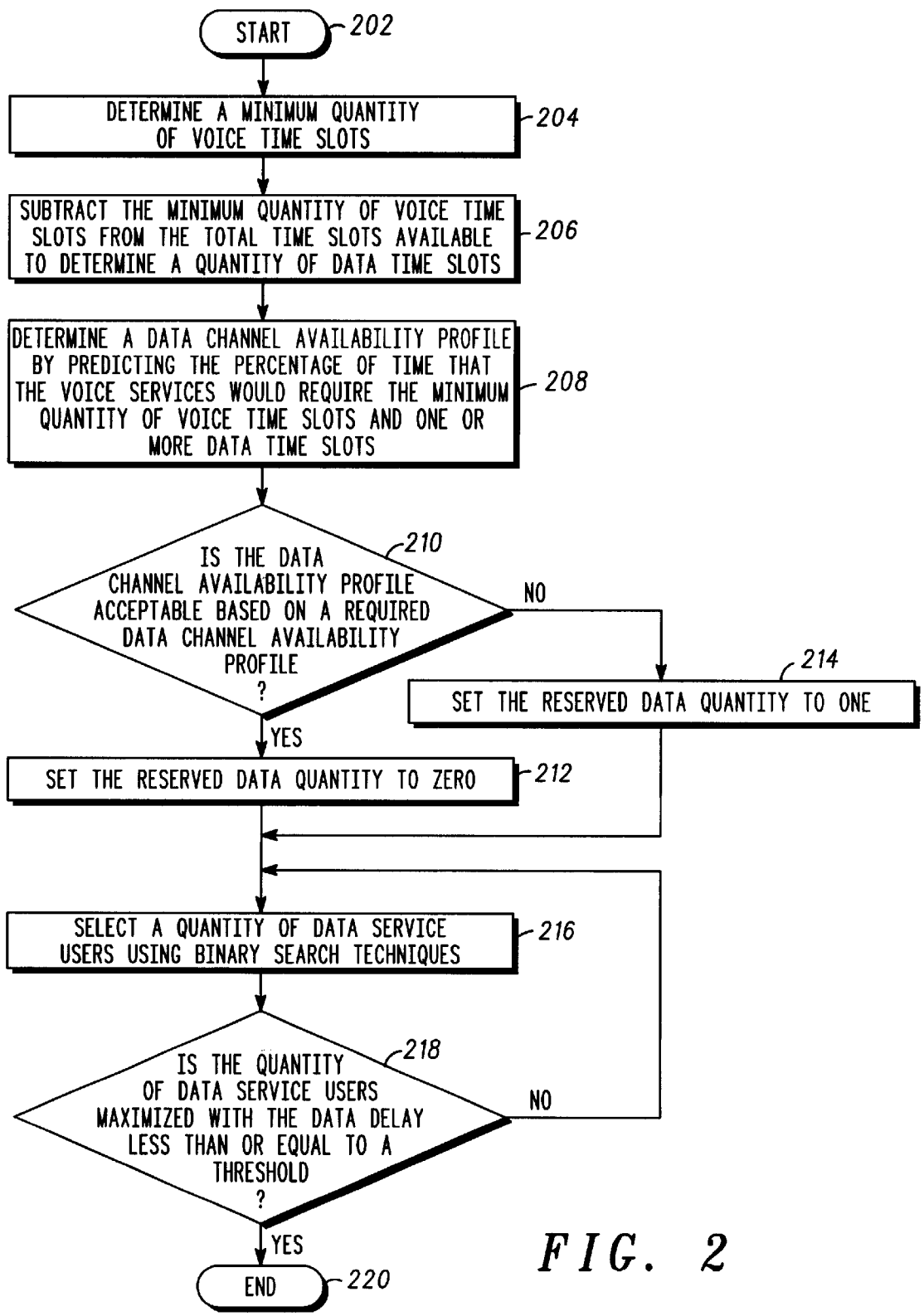
FIG. 2 is a logic flow diagram of steps executed, in accordance with a preferred embodiment of the present invention, to determine a quantity of channel resources to reserve for data services in a communication system, when a total quantity of channel resources in the communication system is fixed.

The present invention can be more fully understood with reference to FIGS. 1 and 2. FIG. 1 is a logic flow diagram 100 of steps executed, in accordance with a preferred embodiment of the present invention, to determine a quantity of channel resources to reserve for data services in a communication system when a total quantity of channel resources in the communication system is not fixed. In the preferred embodiment, the methods of the present invention are applied to "MOTOROLA" "iDEN" communication systems. Thus, the channel resources comprise time division multiplexed (TDM) time slots transmitted and received by communication devices such as "iDEN" base radios.

The logic flow begins (102) with steps that determine a minimum number of channel resources necessary to provide data services with an average data delay that is less than or equal to a data delay threshold. Preferably, data delay refers to a round-trip data delay. For example, the data delay for a particular "iDEN" data packet is the time required for the data packet to be completely received by the target device and an acknowledgment received by the sending device acknowledging the successful transfer of the entire data packet to the target device. The data delay threshold, then, is the maximum acceptable round-trip delay for a data packet. In the preferred embodiment, the data delay threshold is typically three seconds.

Determining an average data delay for data transfer in a communication system is known to those skilled in the art. For an "iDEN" communication system, for example, there are many factors to consider. Factors influencing the average data delay include the communication protocols used for requesting channel resources, the communication protocols used for retransmitting lost data, variations in the bit error rate of the air interface, the processing time of communication devices involved in the data transfer, variations in data traffic, variations in data packet sizes, and the availability of channel resources. The effect of these factors on the average data delay is modeled for the particular communication system so that an average data delay can be calculated given a number of available channel resources and a data traffic profile. Preferably, the data traffic profile comprises a distribution of data packet sizes and an expected rate of arrival corresponding to each data packet size of the distribution of data packet sizes.

Using the average delay model and the data traffic profile, a minimum number of data channel resources is determined by iteratively calculating the average data delay for an increasing number of data channel resources. For example, set a minimum quantity of data channel resources to zero, initially, and increment (104) to one. The average data delay is calculated for one data channel resource and then compared (106) to the data delay threshold. The minimum quantity of data channel resources is incremented until the average data delay is less than or equal to the data delay threshold. Thus, the minimum quantity of data channel resources is determined.

The logic flow continues with steps that determine a minimum number of channel resources necessary to provide voice services that meet a required voice quality of service. "iDEN" communication systems provide two types of voice services, interconnect and dispatch. The interconnect services are cellular-like telephone services, while the dispatch services are services like group call and private call that are typically offered in two-way radio systems. Because of the different channel resource requirements of interconnect calls verses dispatch calls, a minimum number of dispatch channel resources and a minimum number of interconnect channel resources are determined separately and then combined to determine the minimum quantity of voice channel resources.

Preferably then, the required voice quality of service profile comprises a required maximum percentage of dispatch calls that are queued and a required maximum percentage of interconnect calls that are blocked. In the preferred embodiment, 5% and 2% are typical percentages for the required maximum percentage of dispatch calls that are queued and the required maximum percentage of interconnect calls that are blocked, respectively. Erlang equations are used to determine the dispatch call queuing percentage and interconnect call blocking percentage for a given voice traffic profile and a given number of voice servers.

The voice traffic profile preferably comprises the following information: the quantity of dispatch group calls made in the busiest hour of the day ($N_{gc}$), the average length of a dispatch group call ($L_{gc}$), the average number of cell sites needed to support a dispatch group call ($C_{gc}$), the quantity of dispatch private calls made in the busiest hour of the day ($N_{pc}$), the average length of a dispatch private call ($L_{pc}$), the average number of cell sites needed to support a dispatch private call ($C_{pc}$), the quantity of interconnect calls made in the busiest hour of the day ($N_{ic}$), and the average length of an interconnect call ($L_{ic}$). The voice traffic profile quantities are used to compute the Erlang load used by the Erlang equations. A dispatch Erlang load ($E_d$) and an interconnect Erlang load ($E_i$) are thus computed according to their Erlang definitions.

Using $E_d$ and the Erlang C equation below the dispatch call queuing percentage ($P_d$) is calculated for a given number of dispatch voice servers ($s_d$):

$$P_d = \frac{(E_d)^{S_d} d}{S_d!\left(\frac{S_d - E_d}{S_d}\right)\left[\sum_{n=0}^{S_d-1} \frac{(E_d)^n}{n!} + \frac{(E_d)^{S_d}}{S_d!\left(\frac{S_d - E_d}{S_d}\right)}\right]}$$

$s_d$ is set to a number of dispatch voice servers expected to be below the minimum number of dispatch voice servers that will be required. The minimum number of dispatch voice servers is determined iteratively by incrementing (108) $s_d$, recalculating $P_d$ with the incremented $s_d$, and comparing (110) the resulting $P_d$ with the required maximum percentage of dispatch call queuing. $s_d$ is incremented until $P_d$ is less than or equal to the required maximum percentage of dispatch call queuing. The resulting $s_d$ is the minimum number of dispatch servers.

Likewise, using $E_i$ and the Erlang B equation below, the interconnect call blocking percentage ($P_i$) is calculated for a given number of interconnect voice servers ($s_i$):

$$P_i = \frac{(E_i)^{S_i}}{S_i! \left[ \sum_{n=0}^{S_i} \frac{(E_i)^n}{n!} \right]}$$

$s_i$ is set to a number of interconnect voice servers expected to be below the minimum number of interconnect voice servers that will be required. The minimum number of interconnect voice servers is determined iteratively by incrementing (112) $s_i$, recalculating $P_i$ with the incremented $s_i$, and comparing (114) the resulting $P_i$ with the required maximum percentage of interconnect call blocking. $S_i$ is incremented until $P_i$ is less than or equal to the required maximum percentage of interconnect call blocking. The resulting $s_i$ is the minimum number of interconnect servers. A minimum quantity of voice channel resources is then determined (116) by combining $s_i$ and $s_d$.

With the minimum quantity of data channel resources and the minimum quantity of voice channel resources both known, a total number of channel resources is determined. The minimum quantity of data channel resources and the minimum quantity of voice channel resources are added to produce a minimum quantity of channel resources. Since each communication device provides a group of channel resources, specifically, each "iDEN" base radio provides six time slots, a minimum number of communication devices necessary to provide the minimum quantity of channel resources is determined (118) by dividing the sum by six, and when a remainder results, rounding up to the next integer.

The total number of channel resources available for voice services and data services in the communication system is determined, then, by totaling the channel resources contained in the group of channel resources provided by each communication device of the minimum number of communication devices. Since each "iDEN" base radio of the minimum number of "iDEN" base radios provides six time slots, the total number of channel resources is determined by multiplying the minimum number of communication devices by six. Often the total number of channel resources is greater than the minimum quantity of channel resources producing a quantity of extra channel resources. When this occurs the minimum quantity of voice channel resources is incremented (120) by the quantity of extra channel resources. The extra channel resources may be used for either voice or data services, but for the purpose of further calculations, the extra channel resources are considered voice channel resources.

Because voice services are given priority over data services when there are not enough channel resources to support both, data channel resources may need to be reserved for data services to meet a required data channel availability profile. Preferably, the required data channel availability profile comprises a minimum percent of time that is acceptable for the minimum quantity of data channel resources to be available for data services (typically 99%). Thus, in the preferred embodiment, a data channel availability profile that comprises a minimum percent of time that the minimum quantity of data channel resources are available for data services is determined. The data channel availability profile is determined (122) then by predicting a percentage of time that the voice services would use the minimum quantity of voice channel resources and, additionally, one or more data channel resources of the minimum quantity of data channel resources.

In the preferred embodiment, the Erlang C equation above is used to determine the percentage of time, or probability, that the voice services will encroach on the data channel resources. Since the minimum quantity of voice channel resources, possibly including any extra channel resources, is known, the number of voice servers and thus the probability can be calculated from the equations. The probability calculated is subtracted from one to derive the probability, or percent of time, that the minimum quantity of data channel resources are available for data services. Thus, the data channel availability profile is determined.

If (124) the data channel availability profile is acceptable based on the required data channel availability profile, then a reserved data channel quantity is set (126) to zero and the logic flow ends (130). In the preferred embodiment, if the percent of time that the minimum quantity of data channel resources are available for data services, is greater than or equal to the minimum percent of time that is acceptable for the minimum quantity of data channel resources to be available for data services, then no data channels need to be reserved for data services.

Otherwise, when the data channel availability profile is not acceptable based on the required data channel availability profile, then a reserved data channel quantity is set (128) to a minimum number of data channel resources and the logic flow ends (130). Since the percent of time that the minimum quantity of data channel resources are available for data services is less than the minimum percent of time that is acceptable, a minimum number of data channel resources need to be reserved for data services. The reserved data channel quantity is preferably set to a minimum number of data channel resources less than or equal to the minimum quantity of data channel resources. The reserved data channel quantity is also preferably set to the minimum number of data channel resources that, when used to determine a new data channel availability profile, produces a new data channel availability profile that is acceptable based on the required data channel availability profile.

Generally, then, the reserved data channel quantity is set to the fewest number of data channel resources that will guarantee the data channel availability profile to be acceptable. In the preferred embodiment, however, the fewest number of data channel resources is always the minimum number of data channel resources. Thus, when the minimum quantity of data channel resources are available for data services less than the minimum percent of time that is acceptable, the reserved data channel quantity is set to the minimum number of data channel resources.

The method described above with regard to FIG. 1 is a method for determining a quantity of channel resources to reserve for data services when a total quantity of channel resources in the communication system is not fixed. In addition providing steps to determine a quantity of channel resources to reserve for data services, the method above provides steps to determine a minimum number of communication devices needed to provide voice and data services of a specified quality given voice and data traffic profiles.

The method described below, however, with regard to FIG. 2, is a method for determining a quantity of channel resources to reserve for data services when a total quantity of channel resources in the communication system is fixed. Where the method above, is more applicable for sizing and planning new communication systems, the method below is more applicable for adding data services to existing communication systems.

FIG. 2 is a logic flow diagram 200 of steps executed, in accordance with a preferred embodiment of the present invention, to determine a quantity of channel resources to reserve for data services in a communication system when a total quantity of channel resources in the communication system is fixed. The logic flow diagram begins (202) with the step of determining (204) a minimum quantity of voice channel resources necessary to provide voice services that meet a required voice quality of service based on a voice traffic profile. In the preferred embodiment, the minimum quantity of voice channel resources is determined for the present method in the same manner as the minimum quantity of voice channel resources is determined for the method described above with respect to FIG. 1.

Once the minimum quantity of voice channel resources is determined, the quantity of data channel resources is calculated. Since the total quantity of channel resources provided by the communication devices in the communication system is known and fixed, the quantity of data channel resources is determined by subtracting (206) the minimum quantity of voice channel resources from the total quantity of channel resources.

With the minimum quantity of voice channel resources and the voice traffic profile, a data channel availability profile that indicates a predicted availability of the quantity of data channel resources is determined (208). Preferably, the data channel availability profile is determined in the same manner as the data channel availability profile is determined in the method described above. Also, in the same manner as described above, the data channel availability profile is compared to a required data channel availability profile to determine whether (210) the data channel availability profile is acceptable.

When the data channel availability profile is acceptable based on the required data channel availability profile, a reserved data channel quantity is set (212) to zero. When the data channel availability profile is not acceptable based on the required data channel availability profile, the reserved data channel quantity is set (214) to one.

In the preferred embodiment, it is useful to additionally determine the maximum quantity of data service users that can use the data services without an average data delay exceeding a data delay threshold. In the method described above, the minimum quantity of data channel resources is determined by calculating the data delay for an increasing number of data channel resources based on a data traffic profile. The information contained in the data traffic profile is dependent on the quantity of data service users. To determine the maximum quantity of data service users that can use the data services without an average data delay exceeding a data delay threshold, the data delay equations as described above are used. Instead of iterating over the number of data channel resources, iteration is, instead, performed over the number of data service users. The quantity of data channel resources, calculated above from the subtraction, is used then for each iteration.

Since the quantity of data service users can vary over a large range of numbers, binary search techniques are preferably used to select (216) the quantity of data service users for each iteration. Iteration continues until (218) the quantity of data service users is maximized with the calculated data delay less than or equal to the data delay threshold. Upon completing the iteration, the logic flow ends (220).

The present invention provides two methods for determining a quantity of channel resources to reserve for data services in communication systems that support both data and voice services. Because reserving data channel resources reduces the peak voice service capacity of communication systems, the methods minimize the quantity of data channel resources that are reserved to optimize data quality of service and peak voice service capacity. The present invention additionally provides the ability to determine a minimum quantity of channel resources necessary for a communication system to provide a given quality of voice service and data service. Finally, when the size of a particular communication system is fixed, the present invention provides the ability to determine the quantity of data service users that the particular communication system will support for a given quality level of service.

The descriptions of the invention, the specific details, and the drawings mentioned above, are not meant to limit the scope of the present invention. For example, in the preferred embodiment the methods described are tailored to the analysis of "iDEN" communication systems, but the present invention may alternatively be used in the analysis of any TDM communication system. Also, there may be alternative mathematical approaches more or less rigorous than those described herein which are used to determine the values specified in the claims. It is the intent of the inventors that various modifications can be made to the present invention without varying from the spirit and scope of the invention, and it is intended that all such modifications come within the scope of the following claims and their equivalents.

What is claimed is:

1. A method to determine a quantity of channel resources to reserve for data services in a communication system that supports both data services and voice services, the method comprising:

determining, based on a data traffic profile, a minimum number of channel resources necessary to provide data services, to produce a minimum quantity of data channel resources;

determining, based on a voice traffic profile, a minimum number of channel resources necessary to provide voice services that meet a required quality of voice service profile, to produce a minimum quantity of voice channel resources;

determining a total number of channel resources available for voice services and data services in the communication system based on both the minimum quantity of data channel resources and the minimum quantity of voice channel resources;

determining a data channel availability profile that indicates a predicted availability of the minimum quantity of data channel resources based on the voice traffic profile and total number of channel resources;

determining whether the data channel availability profile is acceptable based on a required data channel availability profile;

when the data channel availability profile is acceptable based on the required data channel availability profile, setting a reserved data channel quantity to zero; and when the data channel availability profile is not acceptable based on the data channel availability profile, setting the reserved data channel quantity to a minimum number of data channel resources.

2. The method of claim 1, wherein the step of determining a minimum number of channel resources necessary to provide data services comprises the step of determining, based on a data traffic profile, a minimum number of channel resources necessary to provide data services with an average data delay that is less than or equal to a data delay threshold, to produce a minimum quantity of data channel resources.

3. The method of claim 2, wherein the data delay threshold is a maximum acceptable round-trip delay for a data packet.

4. The method of claim 1, wherein the step of determining a total number of channel resources comprises the steps of:
- adding the minimum quantity of data channel resources and the minimum quantity of voice channel resources to produce a minimum quantity of channel resources;
- determining a minimum number of communication devices necessary to provide the minimum quantity of channel resources, wherein each communication device provides a group of channel resources;
- determining the total number of channel resources available for voice services and data services in the communication system by totaling channel resources contained in the group of channel resources provided by each communication device of the minimum number of communication devices; and
- when the total number of channel resources is greater than the minimum quantity of channel resources producing a quantity of extra channel resources, incrementing the minimum quantity of voice channel resources by the quantity of extra channel resources.

5. The method of claim 1, wherein the step of setting the reserved data channel quantity to a minimum number of data channel resources comprises the step of setting the reserved data channel quantity to a minimum number of data channel resources less than or equal to the minimum quantity of data channel resources, wherein the reserved data channel quantity, when used to determine a new data channel availability profile, produces a new data channel availability profile that is acceptable based on the required data channel availability profile.

6. The method of claim 1, wherein the step of determining a data channel availability profile comprises the step of predicting a percentage of time that the voice services would use the minimum quantity of voice channel resources and additionally one or more data channel resources of the minimum quantity of data channel resources, to produce a data channel availability profile.

7. The method of claim 1, wherein the data traffic profile comprises a distribution of data packet sizes and an expected rate of arrival corresponding to each data packet size of the distribution of data packet sizes.

8. The method of claim 1, wherein the voice traffic profile comprises a quantity of dispatch group calls made in a busiest hour of a day, an average length of a dispatch group call, an average number of cell sites needed to support a dispatch group call, a quantity of dispatch private calls made in a busiest hour of a day, an average length of a dispatch private call, an average number of cell sites needed to support a dispatch private call, a quantity of interconnect calls made in a busiest hour of a day, and an average length of an interconnect call.

9. The method of claim 1, wherein the required voice quality of service profile comprises a required maximum percentage of dispatch calls that are queued and a required maximum percentage of interconnect calls that are blocked.

10. The method of claim 1, wherein the data channel availability profile comprises a minimum percent of time that the minimum quantity of data channel resources are available for data services, and wherein the required data channel availability profile comprises a minimum percent of time that is acceptable for the minimum quantity of data channel resources to be available for data services.

11. The method of claim 1, wherein the communication devices comprise base radios in the communication system; and wherein the channel resources comprise time division multiplexed (TDM) time slots.

12. A method to determine a quantity of channel resources to reserve for data services in a communication system that supports both data services and voice services, the method comprising:
- determining, based on a voice traffic profile, a minimum number of channel resources necessary to provide voice services that meet a required voice quality of service profile, to produce a minimum quantity of voice channel resources;
- subtract the minimum quantity of voice channel resources from a total quantity of channel resources provided by communication devices in the communication system to produce a quantity of data channel resources;
- determining a data channel availability profile that indicates a predicted availability of the quantity of data channel resources based on the voice traffic profile and the minimum quantity of voice channel resources;
- determining whether the data channel availability profile is acceptable based on a required data channel availability profile;
- when the data channel availability profile is acceptable based on the required data channel availability profile, setting a reserved data channel quantity to zero; and
- when the data channel availability profile is not acceptable based on the required data channel availability profile, setting a reserved data channel quantity to one.

13. The method of claim 12, further including the step of determining a maximum quantity of data service users that can use the data services without an average data delay exceeding a data delay threshold.

14. The method of claim 12, wherein the data channel availability profile comprises a minimum percent of time that the minimum quantity of data channel resources are available for data services, and wherein the required data channel availability profile comprises a minimum percent of time that is acceptable for the minimum quantity of data channel resources to be available for data services.

15. The method of claim 12, wherein the reserved data channel quantity is a quantity of data channel resources reserved for data services exclusively.

16. The method of claim 12, wherein the step of determining a data channel availability profile comprises the step of predicting a percentage of time that the voice services would use one or more data channel resources for each number of data channel resources within the minimum quantity of data channel resources, to produce a data channel availability profile.

17. The method of claim 12, wherein the voice traffic profile comprises a quantity of dispatch group calls made in a busiest hour of a day, an average length of a dispatch group call, an average number of cell sites needed to support a dispatch group call, a quantity of dispatch private calls made in a busiest hour of a day, an average length of a dispatch private call, an average number of cell sites needed to support a dispatch private call, a quantity of interconnect calls made in a busiest hour of a day, and an average length of an interconnect call.

18. The method of claim 12, wherein the required voice quality of service profile comprises a required maximum percentage of dispatch calls that are queued and a required maximum percentage of interconnect calls that are blocked.

19. The method of claim 12, wherein the data channel availability profile comprises a minimum percent of time that the minimum quantity of data channel resources are available for data services, and wherein the required data channel availability profile comprises a minimum percent of time that is acceptable for the minimum quantity of data channel resources to be available for data services.

* * * * *

UNITED STATES PATENT AND TRADEMARK OFFICE
CERTIFICATE OF CORRECTION

PATENT NO.    : 6,501,737 B1                                        Page 1 of 1
DATED         : December 31, 2002
INVENTOR(S)   : Mathai et al.

It is certified that error appears in the above-identified patent and that said Letters Patent is hereby corrected as shown below:

<u>Title page,</u>
Item [75], Inventor name "Mathal", should be -- Mathai --.
Item [60], Related U.S. Application Data, should claim priority to -- Provisional Application No. 60/110,436, filed on December 1, 1998 --.

Signed and Sealed this

Twentieth Day of May, 2003

JAMES E. ROGAN
*Director of the United States Patent and Trademark Office*